United States Patent
Suzuki

(10) Patent No.: US 7,146,852 B2
(45) Date of Patent: Dec. 12, 2006

(54) AIR PRESSURE DETECTION DEVICE

(75) Inventor: Akira Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/984,999

(22) Filed: Nov. 10, 2004

(65) Prior Publication Data

US 2005/0097948 A1    May 12, 2005

(30) Foreign Application Priority Data

Nov. 12, 2003    (JP) .......................... P2003-382504

(51) Int. Cl.
  *E01C 23/00*    (2006.01)
(52) U.S. Cl. ............................................. 73/146
(58) Field of Classification Search ................... 73/146
  See application file for complete search history.

(56) References Cited

U.S. PATENT DOCUMENTS 6,684,691 B1 *    2/2004    Rosseau ...................... 73/146

2003/0030553 A1 *    2/2003    Schofield et al. ........... 340/442
2003/0201879 A1 *    10/2003    Munch et al. .............. 340/442
2004/0207518 A1 *    10/2004    Tamimi et al. ............. 340/443

FOREIGN PATENT DOCUMENTS

JP    10-512515    12/1998

* cited by examiner

*Primary Examiner*—Max Noori
(74) *Attorney, Agent, or Firm*—McGinn IP Law Group, PLLC

(57) ABSTRACT

Speed detecting sections 8 which detect the speeds of the respective wheels 2 at the hub sides of the axles 7 are provided, and by comparing the speeds of the respective wheels 2 detected by the speed detecting sections 8 for each two wheels 2 on each axle 7, the speed deflections of the axles 7 are calculated, and from comparison between the speed deflections, the axle 7 with the larger speed deflection between the axles 7 is judged as a pressure lowered tire existing axle. Between two wheels 2 on the pressure lowered tire existing axle, a tire 5 of the wheels 2 with the higher speed is judged as the pressure lowered tire.

14 Claims, 3 Drawing Sheets

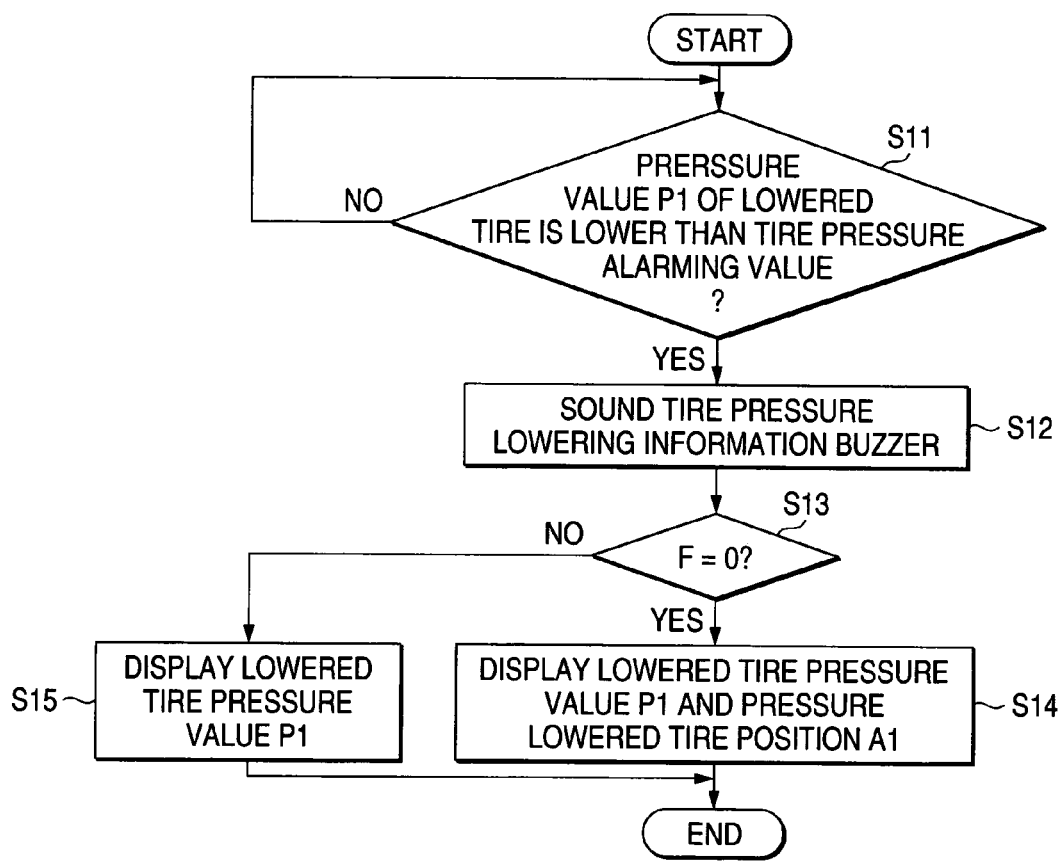

AIR PRESSURE DETECTION DEVICE

This application claims foreign priority based on Japanese patent application No. JP-2003-382504, filed on Nov. 12, 2003, the contents of which is incorporated herein by reference.

BACKGROUND OF THE INVENTION

The present invention relates to an air pressure detection device which directly detects an air pressure of tire by pressure detecting section disposed on each wheel.

Recently, there have been well known that a motor vehicle has a pressure gauge to indicate a pressure decrease to a passenger as soon as the air pressure goes down below a predetermined pressure value. There are two well known devices for that purpose, that is, directly or indirectly to detect the pressure decrease of the respective tires.

The air pressure detection device that directly detects the air pressure in the tire is provided with the pressure detecting section disposed on each wheel to detect the air pressure, and from the pressure detecting section, the pressure value is wirelessly transmitted to a receiving section disposed in the vehicle.

Furthermore, the air pressure detection device that indirectly detects the air pressure of the tire is provided with speed detecting section disposed on a hub of an each axles to detect a rotating speed of the wheel, and from the speed detecting section, the wheel rotating speed is wire-transmitted to a receiving section disposed in the vehicle (for example, refer to JP-A-10-512515). In this case, by comparing the wheel rotating speeds according to running conditions, the air pressure is calculated.

In both direct-type and indirect-type air pressure detection devices, when at least one of the tires becomes lower in the pressure than a predetermined defective pressure value, by using a display section disposed in the vehicle, the driver is informed of which of the tires has lowered in air pressure. Thereby, before the normal running of the vehicle becomes impossible, the driver can recover the air pressure in question to the desired pressure value.

Herein, the indirect-type air pressure detection device has a problem in that a detection accuracy thereof is inferior to that of the direct type, although the air pressure can be calculated from the wheel speed by using the speed detecting section of an anti-lock braking system, etc. Therefore, when the detection accuracy is important, the direct type air pressure detection device is mounted on a vehicle.

However, in the direct-type air pressure detection device, when the four wheels change positions by a tire rotation, it cannot be recognized which air pressure value of the tire is transmitted to the receiving section. Namely, even when the driver recognizes the air pressure decrease, the driver cannot judge which wheel should be replaced with a spare tire, and as a result, the driver cannot take an emergency measure until the driver arrives at a gas station where the air pressure can be measured. Herein, it is considered that receiving sections are set at positions close to respective wheels to detect separately the air pressure values of the wheels, however, this makes the device expensive.

In order to solve these problems, there is known a method in which a tire positional information is transmitted to the receiving section from the pressure detecting sections in addition to the air pressure values. However, even when this structure is used, the tire positional information of the pressure detecting sections must be changed for every tire rotation, and this is very inconvenient. Herein, if the tire is continuously used without changing the tire positional information at the time of tire rotation, the tire positional information different from real tire positions is transmitted and the driver is informed of an incorrect information.

SUMMARY OF THE INVENTION

The present invention has been developed in view of the above-mentioned circumstances, and an object thereof is to provide an air pressure detection device which can identify a tire position the air pressure of which has been lowered even after front and rear right and left tire wheels are rotated in place.

In order to achieve the above-mentioned object, the present invention is characterized by an air pressure detection device comprising pressure detecting means which are set on the respective wheels to detect air pressures, and receiving means which is set on a vehicle body to receive the tire pressure values transmitted from the pressure detecting means, wherein the air pressure detection device is provided with: speed detecting means for detecting the speeds of the respective wheels at hub sides of the axles, speed deflection calculating means for calculating speed deflections of the front side and rear side axles by comparing the wheel speeds detected by the speed detecting means for each two left and right wheels on the front side and the rear side, and pressure lowered tire position judging means which judges the axle with a larger speed deflection between the front side and rear side axles as a pressure lowered tire existing axle by comparing the speed deflections calculated by the speed deflection calculating means, and judges the tire with the higher speed between the two wheels on this pressure lowered tire existing axle as a pressure lowered tire.

According to the present invention, the speeds detected by the speed detecting means for each wheel are compared for each two left and right wheels of the front side and rear side axles by the speed deflection calculating means to calculate the speed deflections on the front side and rear side axles. Herein, the speed detecting means are set on the hub sides of the axles, so that even when the front and rear left and right wheels are changed in place with each other for the tire rotation, etc., it is identified which wheels are detected from, and therefore, the tire rotation does not hinder the calculation of the speed deflections of the axles.

When a load balance is largely different between the front side and the rear side, the wheel speed may be different between the front side and the rear side wheels although the set tire size and the set tire pressure are the same between the front and rear wheels. In the case where the set tire size is different or the set tire pressure is different between the front and rear wheels, the wheel speed may also be different between the front side and the rear side. However, on the left and right wheels of the same axle, the tires are set equally, and the loads applied thereon are also equal to each other. When the tire pressure lowers due to a blowout or the like, the distance from the wheel center of the pressure lowered tire to the ground becomes shorter, so that only one of the left and right wheels increases in speed and the speed becomes different between the left and right wheels of the pressure lowered tire existing axle.

In the present invention, by the pressure lowered tire position judging means, the axle with a larger speed deflection between the front side and rear side axles is judged as a pressure lowered tire existing axle first, and it is identified which of the axles has the pressure lowered tire. Thereby, regardless of the settings and loads of the front and rear wheels of the vehicle, the pressure lowered tire existing axle is accurately identified. Then, by judging the tire of with a higher speed between the two wheels on the pressure lowered tire existing axle as the pressure lowered tire, the position of the pressure lowered tire can be accurately identified.

Therefore, even when the tire pressure values are transmitted to the receiving means form the pressure detecting means without identifying the tire positional information, the tire position where the air pressure has lowered the most can be accurately identified. Thereby, the position of the pressure lowered tire can be identified even after the front and rear right and left wheels are rotated, and as well as accurately informing the driver of the accurate information, the driver can correctly perform operations such as VDC (Vehicle Dynamic Control), 4WS (4 Wheel Steering), etc., by changing the driving state, the braking state, and the steering state, etc., according to the position of the wheel including the pressure lowered tire to prevent the vehicle from, for example, being unstable due to the air pressure lowering.

Moreover, the air pressure detection device may further comprises pressure lowering informing means that informs a driver of the positional information and the air pressure information of the pressure lowered tire when the lowered pressure value judged as the pressure lowered tire by the pressure lowered tire position judging means is lower than a predetermined tire pressure alarming value.

According to the present invention, when the lowered pressure value is lower than the predetermined tire pressure alarming value, the driver is informed of the positional information and the air pressure information on the pressure lowered tire. Namely, the driver can recognize the lowered pressure and replenish the air pressure at a convenient time.

Moreover, the speed detecting means may comprise speed detectors of an anti-lock braking system installed in the vehicle.

According to the present invention, the speeds of the respective wheels can be detected by using the speed detectors of the anti-lock braking system. Therefore, it is unnecessary to set another detection device, etc., separately for wheel speed detection, whereby a manufacturing cost is reduced by using common parts in the vehicle.

As described above, according to the present invention, even when the front and rear left and right tire wheels are changed by the wheel rotation, the position of the tire with lowered pressure can be identified.

BRIEF DESCRIPTION OF THE DRAWINGS

FIG. 3 is a flowchart showing operations of the control section.

DESCRIPTION OF THE PREFERRED EMBODIMENT

Figure 1:
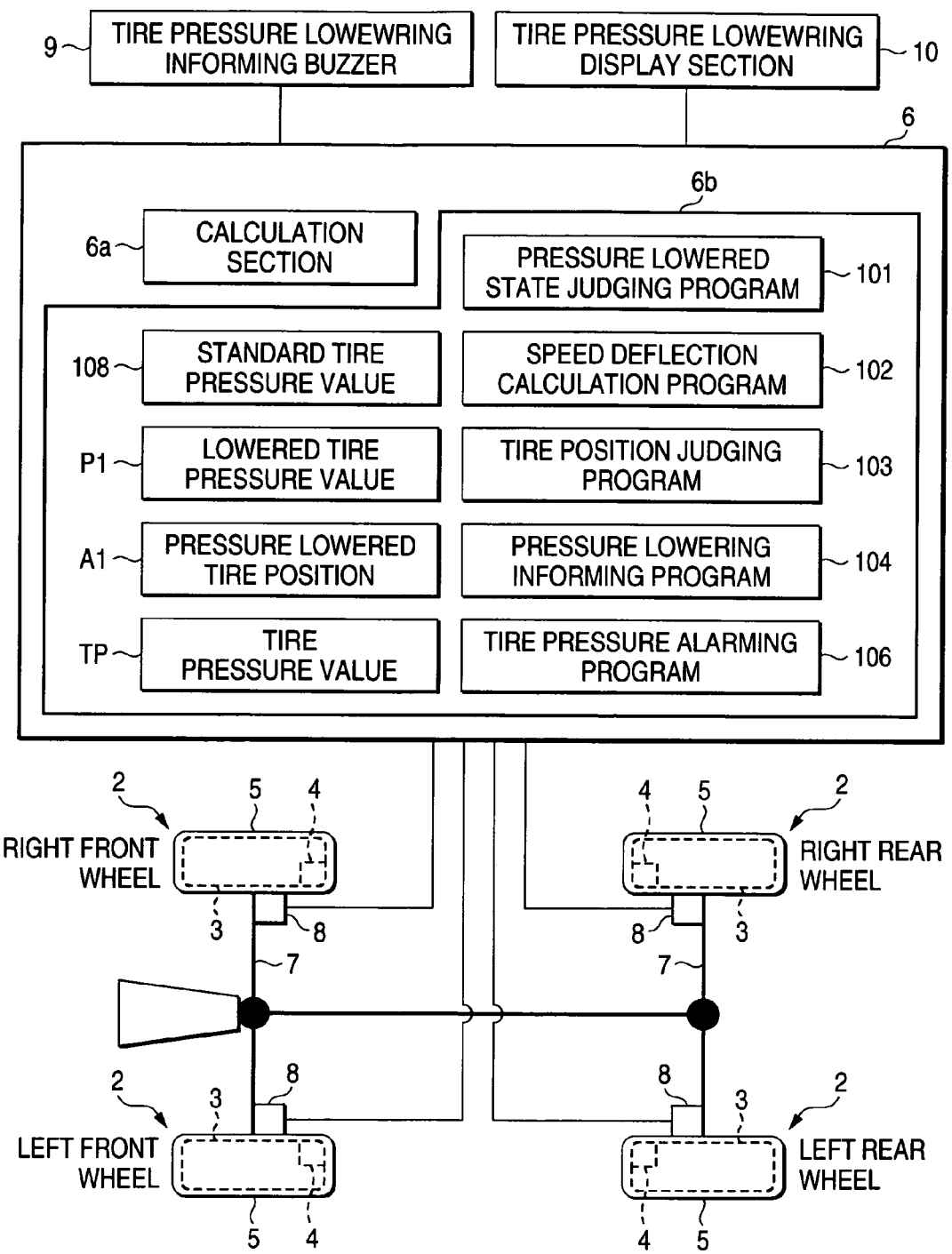
FIG. 1 is a schematic block diagram of an air pressure detection device showing an embodiment of the present invention.
Figure 2:
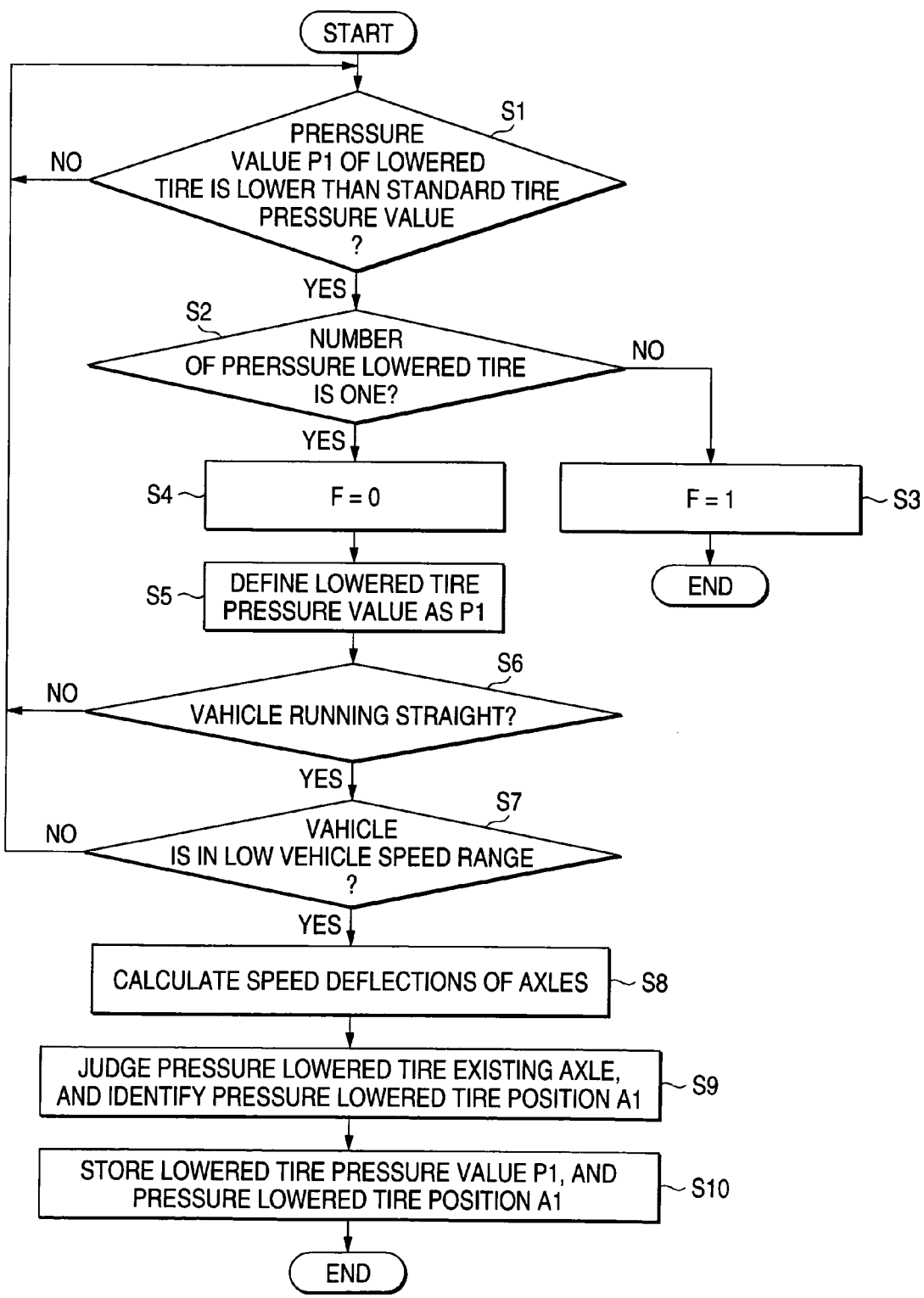
FIG. 2 is a flowchart showing operations of the control section.

FIG. 1 through FIG. 3 show an embodiment of the present invention. FIG. 1 is a schematic block diagram of a tire pressure warning unit. FIG. 2 and FIG. 3 are flowcharts showing operations of a control section.

An air pressure detection device 1 directly detects air pressures in the tires 5 by pressure detecting section 4 disposed on respective wheels 3 of four wheels 2 of a motor vehicle. As shown in FIG. 1, the air pressure detection device 1 comprises a receiving section 6 disposed on a vehicle body side to receive tire pressure values TP transmitted from the respective pressure detecting sections 4 wirelessly. The pressure detecting sections 4 and the receiving section 6 have the similar structure as conventionally known, so that the description thereof is omitted herein.

Furthermore, the air pressure detection device 1 comprises speed detecting sections 8 for detecting the speeds of the respective wheels 2 at hub sides of the front side and the rear side. In this embodiment, the speed detecting sections 8 comprises speed detectors of an anti-lock braking system mounted on the vehicle. The speed detectors have the similar structure as that conventionally known, so that detailed description thereof is not given herein. The speed detecting sections 8 are connected to the receiving section 6 and transmit the speeds of the respective wheels 2 to the receiving section 6.

As shown in FIG. 1, the receiving section 6 has a calculation section 6a consisting of a CPU, etc., and a storage section 6b consisting of, for example, a ROM or RAM, etc. In this embodiment, the storage section 6b stores a pressure lowered state judging program 101 (a pressure lowered state judging section 101) for judging whether or not the number of pressure lowered tires is only one by comparing the four pressure values detected by the pressure detecting sections 4. In this embodiment, four tire pressure values TP detected by the pressure detecting sections 4 are defined as P1, P2, P3, and P4 in order from the smallest value, and the number of pressure lowered tires is judged as one when the difference between P1 and P2 is larger than 0.2 bar and the difference between P2 and P4 is smaller than 0.2 bar. Namely, from a large difference between the P1 and P2, it is accurately judged that one tire is significantly lowered in pressure more than the other three tires. Furthermore, from a small difference between P2 and P4, it is accurately judged that the other three tires have no dispersion and the vehicle condition is normal. Thereby, for example, it is judged whether the wheel rotating speed is high due to a special condition where, for example, the front and rear left and right loads are unbalanced, or only one tire pressure is lowered due to a blowout, etc.

Furthermore, the storage section 6b stores a speed deflection calculation program 102 (a speed deflection calculating section 102) for calculating speed deflections on the front side and the rear side axles 7 by comparing the speeds of the wheels 2 detected by the speed detecting sections 8 for each two left and right wheels 2 on the front side and rear side axles 7. Namely, in this embodiment, the receiving section 6 comprises the speed deflection calculation section. Furthermore, the storage section 6b stores a pressure lowered tire position judging program 103 (a pressure lowered tire position judging section 103) for judging an, axle 7 with a larger speed deflection between the front side and rear side axles 7 as a pressure lowered tire existing axle and judging a tire 5 of the wheel with the higher speed between the two wheels 2 on the pressure lowered tire existing axle as a pressure lowered tire. Namely, in this embodiment, the receiving section 6 comprises a pressure lowered tire position judging section.

Furthermore, the storage section 6b stores a pressure lowering informing program 104 (a pressure lowering informing section 104) for informing the driver of the positional information and the air pressure information of the pressure lowered tire when the lowered pressure value of the tire judged as the pressure lowered tire by the pressure lowered tire position judging program 103 is lower than a predetermined tire pressure alarming value 106. In this embodiment, the driver is informed of the information by a tire pressure lowering informing buzzer 9 that is disposed near a driver seat and connected to the receiving section 6, and a tire pressure lowering display section 10 that is disposed on an instrument panel and connected to the receiving section 6. Namely, in this embodiment, the receiving section 6, the tire pressure lowering informing buzzer 9, and the tire pressure lowering display section 10 constitute a pressure lowering informing section.

The operation in the receiving section 6 of the air pressure detection device 1 for judging the position of a tire the air pressure of which has been lowered structured as mentioned above is described with reference to the flowchart of FIG. 2.

First, it is judged whether or not the air pressure value P1 of the pressure lowered tire is lower than a standard tire pressure value 108 (Step S1), and when the air pressure value P1 is equal to or more than the standard tire pressure value 108, the process returns to the Step S1 and turns into a stand-by state. Herein, in the Step S1, when the air pressure value P1 is lower than the standard tire pressure value 108, it is judged whether or not the number of pressure lowered tires is one (Step S2).

Herein, when it is judged that the number of pressure lowered tires is not one, the flag F is set to 1 (Step S3) and the control is ended. Thereby, when the wheel speed is high due to a special condition where, for example, the loads on the vehicle front and rear left and right tires are unbalanced, the pressure lowered tires are not identified.

When it is judged that the number of pressure lowered tires is one, the flag F is set to 0 (Step S4), and then the lowered pressure value of the pressure lowered tire is defined as P1 (Step S5). Thereafter, it is judged whether or not the vehicle is running straight (Step S6), and thereafter, when it is running straight, it is subsequently judged whether or not the speed is in a low vehicle speed range (Step S7). The reason for this is that the tire motion radius highly depends on the vehicle speed in a high vehicle speed range, and errors caused by changes in motion radius due to vehicle speed changes can be prevented. Furthermore, the vehicle speed does not largely change instantaneously, so that the low vehicle speed range condition of the Step S7 is not essential. When the vehicle is not running straight in the Step 6 and the vehicle is not in a low vehicle speed range in the Step 7, the process returns to the Step S1 and turns into a stand-by state. The judgement as to whether the vehicle is running straight or not can be made by detecting the steering amount of the steering wheel.

In the Step S7, when it is judged that the vehicle speed is in the low vehicle speed range, the speed deflections of the axles 7 on the front side and the rear side of the vehicle are calculated (Step S8). In this embodiment, by defining the front side speed deflection as of and the rear side speed deflection as or, the front side and rear side speed deflections are calculated by the following equations:

$$\sigma f = (Nf\text{max} - Nf\text{min})/Nf\text{min}$$

$$\sigma r = (Nr\text{max} - Nr\text{min})/Nr\text{min}$$

Herein, Nfmax denotes the higher wheel speed of the front side, Nfmin denotes the lower wheel speed of the front side, Nrmax denotes the higher wheel speed of the rear side, and Nrmin denotes the lower wheel speed of the rear side.

By comparing the speed deflections of and or thus calculated, the axle 7 with the larger speed deflection is regarded as a pressure lowered tire existing axle, and between two wheels 2 on this pressure lowered tire existing axle, a tire 5 on the wheel with the higher speed is judged as a pressure lowered tire (Step S9). Thereafter, the lowered tire pressure value P1 acquired in the Step S5 and the pressure lowered tire position Al acquired in the Step S9 are stored in the storage section 6b (Step S10), and then the control is ended.

Next, the operations in the receiving section 6 of the air pressure detection device 1 for informing and warning the information on the tire the air pressure of which has been lowered are described with reference to the flowchart of FIG. 3.

First, it is judged whether or not the latest lowered tire pressure value P1 stored in the storage section 6b is lower than the tire pressure alarming value 106 (Step S11), and when the lowered tire pressure value P1 is equal to or more than the tire pressure alarming value 106, the process returns to the Step S11 and turns into a stand-by state. Herein, when the lowered pressure value P1 is lower than the tire pressure alarming value 106, the tire pressure lowering informing buzzer 9 is sounded (Step S12).

Next, it is judged whether or not the flag F is 0 (Step S13), and when the flag F is 0, the pressure lowered tire position A1 and the lowered tire pressure value P1 are displayed on the pressure lowering display section 10 (Step S14). On the other hand, in Step S13, when the flag F is 1, only the lowered pressure value P1 is displayed on the pressure lowering display section 10 (Step S15).

As described above, according to the air pressure detection device 1 of this embodiment, by comparing the speeds of the respective wheels 2 detected by the speed detecting sections 8 for each two left and right wheels 2 on the front side and rear side axles 7 by the speed deflection calculation section, the speed deflections on the front side and rear side axles 7 are calculated. Herein, the speed detecting sections 8 are set on the hub sides of the respective axles 7, so that even when the front and rear left and right wheels 4 made to change the positions with each other for the tire rotation, etc., it is identified which of the wheels 2 the four detected speeds are of, so that the calculation of the speed deflections of the axles 7 is not hindered.

In the case where the load balance is different between the front side and the rear side of the vehicle, even when the set tire size and the set tire pressure between the front and rear wheels of the vehicle are the same between these, the speeds of the wheels 2 may be different between the front side and rear side. Furthermore, in some cases where the set tire size is different between the front and rear wheels of the vehicle, or the set tire pressure is different between these, the speeds of the wheels 2 are different between the front side and the rear side. However, between the left and right wheels on the same axle of the vehicle, the tires 5 are set equally, and the loads applied thereto are also almost equal. Then, when the tire 5 lowers the pressure due to the blowout, etc., the distance from the center of the wheel 4 of the pressure lowered tire to the ground becomes shorter, so that only one of the left and right wheels increases the speed and the speeds of the left and right wheels on the pressure lowered tire existing axle become different from each other.

In this embodiment, by the pressure lowered tire position judging program 101, first, the axle 7 with the larger speed deflection between the front side and rear side axles 7 is judged as a pressure lowered tire existing axle, and it is identified which of the axles 7 the pressure lowered tire exists on. Thereby, regardless of the tire settings and the load balance of the front and rear wheels of the vehicle, the pressure lowered tire existing axle is accurately identified.

Then, by judging the tire 5 of the wheels 2 that has the higher speed between the two wheels 2 on the pressure lowered tire existing axle as a pressure lowered tire, the position of the pressure lowered tire can be accurately identified.

Therefore, even when the tire pressure values TP are transmitted from the pressure detecting sections 4 to the receiving section 6 without identifying the tire positional information, the position of the tire that has been lowered to be the lowest in the pressure can be identified. Thereby, even after the front and rear left and right wheels 4 are rotated, the position of the tire that has lowered in the pressure can be identified, and the driver can be naturally informed of the accurate information, and for example, to prevent the vehicle from being unstable due to the air pressure lowering, the driver can properly perform the operations of VDC (Vehicle Dynamics Control) and 4WS (4 Wheel Steering), etc., by changing the driving state, the braking state, and the steering state, etc., according to the position of the wheel 2 including the pressure lowered tire.

Furthermore, according to the air pressure detection device 1 of this embodiment, when the lowered pressure value 5 is lower than the predetermined pressure alarming value 106, the driver of the vehicle is informed of the pressure lowered tire position A1 and the lowered pressure value P1. Namely, the driver can recognize the pressure lowering in the tire 5 and replenish its air pressure at a convenient time.

Furthermore, according to the air pressure detection device 1 of this embodiment, the speeds of the respective wheels 2 can be detected by using speed detectors of an anti-lock braking system. Therefore, it is unnecessary to additionally install detecting devices, etc., for detection of the speeds of the respective wheels 2, and therefore, the manufacturing cost can be reduced by common use of the parts of the vehicle.

Furthermore, in the embodiment described above, informing the driver is performed by using the pressure lowering informing buzzer 9 and the pressure lowering display section 10, however, it is also possible that either one is used, and in addition, as a matter of fact, the detailed structures, etc., are changeable as appropriate.

It will be understood to those skilled in the art that various modifications and variations can be made to the described preferred embodiments of the present invention without departing from the spirit or scope of the invention. Thus, it is intended that the present invention cover all modifications and variations of the present invention consistent with the scope of the appended claims and their equivalents.

What is claimed is:

1. An air pressure detection device, comprising:
   pressure detecting sections respectively disposed on four wheels for detecting air pressures in tires;
   a receiving section disposed on a vehicle body side for receiving tire pressure values transmitted from the pressure detecting sections;
   speed detecting sections respectively disposed on hub sides of axles for detecting the speeds of the four wheels;
   a speed deflection calculating section for calculating speed deflections of the front and rear axles by comparing the speeds of the wheels detected for each left and right wheel on the front and rear axle; and
   a pressure lowered tire position judging section for judging an axle with a larger speed deflection between the front and rear axles as a pressure lowered tire existing axle by comparing the speed deflections and for judging a tire of a wheel with the higher speed between the two wheels on the pressure lowered tire existing axle as a pressure lowered tire.

2. The air pressure detection device according to claim 1, further comprising:
   a pressure lowering informing section for informing a driver of positional information and an air pressure information of the pressure lowered tire when the tire pressure value of the tire judged as the pressure lowered tire is lower than a predetermined tire pressure alarming value.

3. The air pressure detection device according to claim 1, wherein the speed detecting sections comprise speed detectors of an anti-lock braking system.

4. The air pressure detection device according to claim 2, wherein the speed detecting sections comprise speed detectors of an anti-lock braking system.

5. An air pressure detection device, comprising:
   pressure detecting means respectively disposed on four wheels for detecting air pressures in tires;
   receiving means disposed on a vehicle body side for receiving tire pressure values transmitted from the pressure detecting means;
   speed detecting means respectively disposed on hub sides of axles for detecting the speeds of the four wheels;
   speed deflection calculating means for calculating speed deflections of the front and rear axles by comparing the speeds of the wheels detected for each left and right wheel on the front and rear axle; and
   pressure lowered tire position judging means for judging an axle with a larger speed deflection between the front and rear axles as a pressure lowered tire existing axle by comparing the speed deflections, and for judging a tire of a wheel with the higher speed between the two wheels on the pressure lowered tire existing axle as a pressure lowered tire.

6. The air pressure detection device according to claim 5, further comprising:
   pressure lowering informing means for informing a driver of positional information and an air pressure information of the pressure lowered tire when the tire pressure value of the tire judged as the pressure lowered tire is lower than a predetermined tire pressure alarming value.

7. The air pressure detection device according to claim 5, wherein the speed detecting means comprises speed detector of an anti-lock braking system.

8. The air pressure detection device according to claim 6, wherein the speed detecting means comprises speed detector of an anti-lock braking system.

9. The air pressure detection device according to claim 1, further comprising:
   a pressure lowered state judging section for judging a number of pressure lowered tires by comparing the pressure values detected in the pressure detecting sections.

10. The air pressure detection device according to claim 5, further comprising:
    pressure lowered state judging means for judging a number of pressure lowered tires by comparing the pressure values detected in the pressure detecting sections.

11. The air pressure detection device according to claim 9, wherein the number of pressure lowered tires is determined as only one tire when the difference between the lowest tire pressure and the second lowest tire pressure is greater than 0.2 bar, and the difference between the second lowest tire pressure and the highest tire pressure is less than 0.2 bar.

12. The air pressure detection device according to claim 10, wherein the number of pressure lowered tires is determined as only one tire when the difference between the lowest tire pressure and the second lowest tire pressure is greater than 0.2 bar, and the difference between the second lowest tire pressure and the highest tire pressure is less than 0.2 bar.

13. The air pressure detection device according to claim 1, wherein the speed deflection calculating section calculates a front axle speed deflection equal to the difference between the higher front wheel speed of the front axle and the lower front wheel speed of the front axle, divided by the lower front wheel speed of the front axle, and wherein the speed deflection calculating section calculates a rear axle speed deflection equal to the difference between the higher rear wheel speed of the rear axle and the lower rear wheel speed of the rear axle, divided by the lower rear wheel speed of the rear axle.

14. The air pressure detection device according to claim 5, wherein the speed deflection calculating means calculates a front axle speed deflection equal to the difference between the higher front wheel speed of the front axle and the lower front wheel speed of the front axle, divided by the lower front wheel speed of the front axle, and wherein the speed deflection calculating means calculates a rear axle speed deflection equal to the difference between the higher rear wheel speed of the rear axle and the lower rear wheel speed of the rear axle, divided by the lower rear wheel speed of the rear axle.

* * * * *